(12) United States Patent
Bell et al.

(10) Patent No.: US 9,507,960 B2
(45) Date of Patent: Nov. 29, 2016

(54) SYSTEMS AND METHODS FOR AUTOMATED DATA PRIVACY COMPLIANCE

(71) Applicant: Citigroup Technology, Inc., Weehawken, NJ (US)

(72) Inventors: Wanda Bell, West Orange, NJ (US); Lewis Ahron Kaufman, Monroe Township, NJ (US); William Joseph Krajewski, Thornton, PA (US); John J. McGillicuddy, Roselle Park, NJ (US); Paul Aloysius Scanlon, Jr., Millington, NJ (US); Abhijit Dey, Annandale, NJ (US); Sharon Ameet Fanse, Pune (IN); Giridhar Holenarsipur Nagaraj, Princeton, NJ (US); Shyamli Rai, Jersey City, NJ (US); Sunitha Sundaramurthy, Stirling, NJ (US); Gurpreet Chahil, Berkeley Heights, NJ (US); Jeetendra Chandwani, Kendall Park, NJ (US); Arham Gupta, Baltimore, MD (US); Mangesh Ashok Karhadkar, Mississauga (CA); Vincent Francis La Padula, Joppa, MD (US); Paul J. Murray, Ponte Vedra, FL (US); Himanshu Shailesh Shah, Mumbai (IN); Rasika Vartak, Palghar (IN)

(73) Assignee: Citigroup Technology, Inc., Weehawken, NJ (US)

(*) Notice: Subject to any disclaimer, the term of this patent is extended or adjusted under 35 U.S.C. 154(b) by 0 days.

(21) Appl. No.: 14/631,373

(22) Filed: Feb. 25, 2015

(65) Prior Publication Data
US 2016/0246991 A1 Aug. 25, 2016

(51) Int. Cl.
*H04L 29/06* (2006.01)
*G06F 21/62* (2013.01)

(52) U.S. Cl.
CPC .............................. *G06F 21/6245* (2013.01)

(58) Field of Classification Search
CPC ............................ G06F 21/552; G06F 21/577
USPC ...................................................... 726/1, 25
See application file for complete search history.

(56) References Cited

U.S. PATENT DOCUMENTS

| 8,185,931 B1* | 5/2012 | Reeves | ............................. 726/1 |
| 8,799,053 B1* | 8/2014 | Goldberg | ..................... 705/7.29 |

(Continued)

OTHER PUBLICATIONS

International Search Report and Written Opinion for PCT/US2016/019169, Mar. 25, 2016, 11.

*Primary Examiner* — Izunna Okeke
*Assistant Examiner* — Hee Song
(74) *Attorney, Agent, or Firm* — John M. Harrington, Esq.; Johnson, Marcou & Isaacs, LLC (57) ABSTRACT

Systems and methods for automated data privacy compliance involve a data privacy operations server receiving information via a web server regarding an initiative and packaging the initiative information for assessment by a data privacy legal compliance function. One or more databases storing an inventory of data privacy compliance requirements resources are accessible by the data privacy legal compliance function via a relational database server to assess the packaged initiative information. A clear function generates an approval recommendation based on the assessment of the packaged initiative information by the data privacy legal compliance function.

20 Claims, 2 Drawing Sheets

(56) References Cited

U.S. PATENT DOCUMENTS

| | | | |
|---|---|---|---|
| 2004/0098285 A1* | 5/2004 | Breslin et al. | 705/1 |
| 2005/0257267 A1* | 11/2005 | Williams et al. | 726/25 |
| 2007/0266420 A1* | 11/2007 | Hawkins et al. | 726/1 |
| 2009/0254511 A1* | 10/2009 | Yeap et al. | 707/1 |
| 2010/0114634 A1* | 5/2010 | Christiansen et al. | 705/7 |
| 2011/0022836 A1* | 1/2011 | Murphy | H04L 63/0823 713/155 |
| 2011/0270872 A1* | 11/2011 | Alvarez | G06Q 10/06 707/769 |
| 2013/0269035 A1* | 10/2013 | Bajaj | G06Q 10/00 726/26 |
| 2014/0173684 A1* | 6/2014 | McQuay et al. | 726/1 |

* cited by examiner

SYSTEMS AND METHODS FOR AUTOMATED DATA PRIVACY COMPLIANCE

FIELD OF THE INVENTION

The present invention relates generally to the field of data privacy, and more particularly to systems and methods for automating data privacy law compliance.

BACKGROUND OF THE INVENTION

Currently, comprehensive data privacy laws (also known as data protection laws) that prohibit the disclosure or misuse of information held on private individuals have been adopted in numerous countries throughout the world. Thus, it may be necessary for financial institutions, such as global banks, to assure that they file for and/or secure approvals from all appropriate regulators in various countries that have data privacy or data protection laws regarding, for example, the movement of data across borders.

In some countries, the data protection or privacy regulators may comprise official data privacy or data protections offices from whom such approvals must be sought. In other countries, there may be financial services or other types of organizations within those countries that may typically require various types of approvals addressing the use of personally identifiable information and its purposes. In addition, some countries may have references in their respective constitutions regarding the use of personally identifiable information. It is self-apparent that privacy and data protection requirements are very significant issues, for example, for entities such as financial institutions that operate in a large number of countries.

There is a present need for systems and methods that enable entities that operate in a large number of countries to ensure that they are in compliance with data privacy or protection laws associated with personally identifiable information in all such countries.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform the automated data privacy compliance described herein. Embodiments of the invention provide systems that may employ, for example, a data privacy operations server having a processor coupled to memory, the processor being programmed to receive information via a web server regarding an initiative, the data privacy operations server processor being further programmed to package the received initiative information for assessment by a data privacy legal compliance function of the processor; at least one database storing an inventory of data privacy compliance requirements resources accessible by the data privacy legal compliance function of the data privacy operations server processor via a relational database server to assess the packaged initiative information; and a clear function of the data privacy operations server processor that generates an approval recommendation based on the assessment of the packaged initiative information by the data privacy legal compliance function of the data privacy operations server processor.

Further aspects of embodiments of the invention may employ, for example, at least one terminal coupled to the data privacy operations server that displays a user interface implemented by at least a model-view-controller of the data privacy operations server processor. In other aspects, the user interface may, for example, format and display data privacy compliance requirements from the data privacy compliance requirements resources accessed by the data privacy legal compliance function. In still other aspects, the user interface may display, for example, a plurality of data entry fields to receive the initiative information. In additional aspects, the user interface may, for example, display the plurality of data entry fields to receive the initiative information and define a dataset addressing data privacy legal compliance requirements for a plurality of different countries. In still further aspects, the user interface may, for example, display the plurality of data entry fields to define a dataset addressing data privacy legal compliance requirements for a plurality of different countries responsive to country-specific queries.

Additional aspects of embodiments of the invention may employ, for example, a workflow engine of the data privacy operations server processor that advances the packaged initiative information to the data privacy legal compliance function of the data privacy operations server processor. In other aspects, the at least one database storing the inventory of data privacy compliance requirements resources may, for example, be communicatively coupled to the data privacy legal compliance function of the data privacy operations server processor via a service-oriented architecture web service. In further aspects, the at least one database may comprise, for example, a data standards management interface, a systems inventory, a global data warehouse, and a supplier policy interface. In still further aspects, the inventory of data privacy compliance requirements resources stored on the at least one database may comprise, for example, an electronic library of data privacy protection legal requirements. In additional aspects, the clear function of the data privacy operations server processor may generate, for example, an approval comprising confirmation that a notification was generated to, or an approval was sought and received from, predetermined data privacy legal compliance officials for the initiative.

Embodiments of the invention may also provide methods involving, for example, receiving, by a data privacy operations server having a processor coupled to memory, information via a web server regarding an initiative; packaging, by the data privacy operations server processor, the received initiative information for assessment by a data privacy legal compliance function of the data privacy operations server processor; accessing, by the data privacy legal compliance function of the data privacy operations server processor, at least one database storing an inventory of data privacy compliance requirements resources via a relational database server; assessing, by the data privacy legal compliance function of the data privacy operations server processor, the packaged initiative information; and generating, by a clear function of the data privacy operations server processor, an approval recommendation based on the assessment of the packaged initiative information by the data privacy legal compliance function of the data privacy operations server processor.

In aspects of embodiments of the invention, receiving the information may involve, for example, receiving the information regarding the initiative via at least one terminal coupled to the data privacy operations server displaying a user interface implemented by at least a model-view-controller of the data privacy operations server processor. In further aspects, receiving the information may involve, for example, receiving the information regarding the initiative via the user interface displaying a plurality of data entry fields defining a dataset addressing data privacy legal compliance requirements. In other aspects, receiving the information may involve, for example, receiving the information regarding the initiative via the user interface displaying the plurality of data entry fields for receiving the initiative information defining the dataset addressing data privacy legal compliance requirements for a plurality of different countries. In still other aspects, receiving the information may involve, for example, receiving the information regarding the initiative via the user interface displaying the plurality of data entry fields for entry of data privacy legal compliance information responsive to country-specific queries.

In additional aspects of embodiments of the invention, packaging the received initiative information may involve, for example, advancing the packaged initiative information to the data privacy legal compliance function of the data privacy operations server processor by a workflow engine of the data privacy operations server processor. In other aspects, accessing the at least one database may involve, for example, accessing the at least one database storing the inventory of data privacy compliance requirements resources communicatively coupled to the data privacy legal compliance function of the data privacy operations server processor via a service-oriented architecture web service. In still other aspects, accessing the at least one database may involve, for example, formatting and displaying, on the at least one terminal, data privacy compliance requirements from the data privacy compliance requirements resources stored on the at least one database accessed by the data privacy legal compliance function.

In further aspects of embodiments of the invention, assessing the packaged initiative information may involve, for example, assessing the packaged initiative information based at least in part on data from the inventory of data privacy compliance requirements resources comprising a data standards management interface, a systems inventory, a global data warehouse, and a supplier policy interface. In additional aspects, assessing the packaged initiative information may involve, for example, assessing the packaged initiative information based at least in part on data from the inventory of data privacy compliance requirements resources comprising an electronic library of data privacy protection legal requirements. In other aspects, generating the approval recommendation may involve, for example, generating an approval recommendation comprising confirmation that a notification was generated to, or an approval was sought and received from, predetermined data privacy legal compliance officials for the initiative.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention provide a data privacy automated tool (DPAT) that may ensure that an entity operating in several countries is in compliance with data privacy and protection laws in all of those countries. A process for embodiments of the invention may involve stages, such as receiving data for an initiative, initiative clarification, data privacy review of the initiative, publishing the initiative to various countries, country compliance review of the initiative, and initiative review and clearance. In the receiving stage, data for an initiative may be received by the system for embodiments of the invention, for example, from a business unit of an entity, such as a financial institution. In the clarification stage, requests for clarifications may be generated, and in the data privacy review stage, the initiative may be reviewed.

In the publishing stage, the initiative may be published to various countries, and in the country compliance review stage, the initiative may be further reviewed and evaluated by country compliance, legal, and human resources functions to complete actions. Thereafter, in the review and clearance stage, the initiative may be again reviewed, action items may be closed, and a notice may be generated to the business unit of a clearance status for the initiative.

Figure 1:
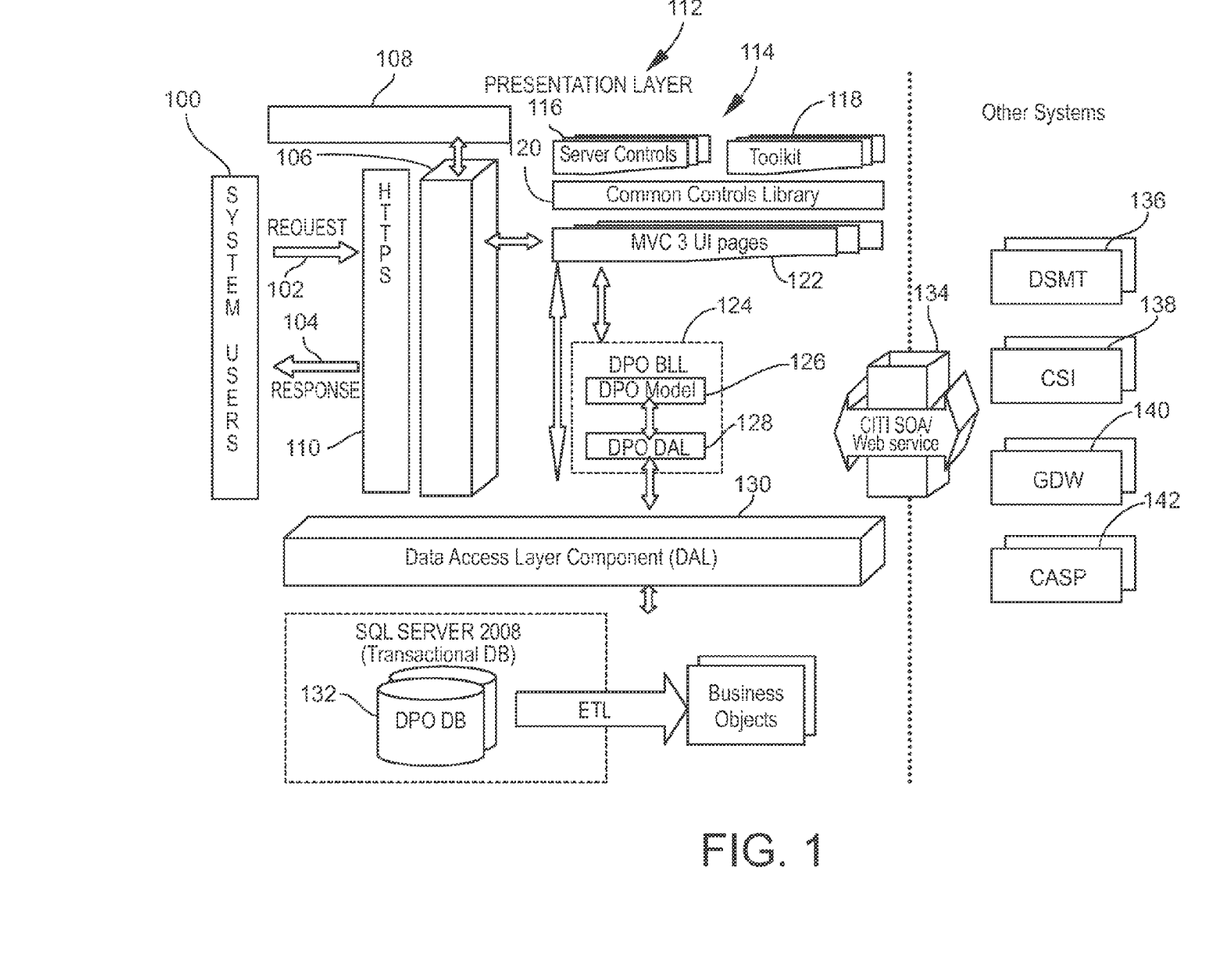
FIG. 1 is a schematic diagram that illustrates an example of components and a flow of information between components for a system according to embodiments of the invention.

FIG. 1 is a schematic diagram that illustrates an example of components and a flow of information between components for a system according to embodiments of the invention. Referring to FIG. 1, a user 100 may access a system for embodiments of the invention to enter data 102 and receive responses 104 via a web server 106, such as INTERNET INFORMATION SERVER® (IIS) by MICROSOFT® using a web access management architecture 108, such as SITEMINDER® by COMPUTER ASSOCIATES®, and Hypertext Transfer Protocol Secure (HTTPS) protocol.

Referring further to FIG. 1, a system for embodiments of the invention may include a presentation layer 112 that may employ, for example, an open source server-side web application framework 114, such as ASP.NET, server controls 116, a controls extender toolkit 118, such as AJAX® Toolkit by MICROSOFT®, a common controls library 120, and a model-view-controller (MVC) 122 for implementing user interfaces. The presentation layer 112 may also include, for example, a data privacy operations business logic layer 124, comprising a data privacy operations model 126 and a data privacy operations data access layer 128. It is to be understood that the foregoing references to particular servers, architectures, protocols, frameworks, toolkits, libraries, and other components are examples only and that embodiments of the invention are not limited to such examples.

Referring once more to FIG. 1, a system for embodiments of the invention may also include, for example, a data access layer component 130 comprising, for example, one or more structured query language data privacy operations databases 132, such as SQL SERVER 2008® by MICROSOFT®, via which business objects may be extracted, transformed, and loaded into a final target, such as an operational data store. It is likewise to be understood that the foregoing reference to a particular server is an example only and that embodiments of the invention are not limited to such an example. Thus, a system for embodiments of the invention may employ, for example, a service-oriented architecture/web service 134 by which other systems may be communicatively coupled to the presentation layer 112.

Such other systems may include, for example, information source and reference interfaces, such as a data standards management tool interface 136, a systems inventory of the entity interface 138, a global entity management system interface 140, and an entity-approved supplier policy interface 142, as well as a real estate management system (not shown) and a global data warehouse (not shown). In addition, embodiments of the invention may employ, for example, one or more structured query language (SQL) relational database servers for storing and processing information.

The data standards management tool 136 may comprise, for example, an interface that allows selection of one or more legal entities for each country selected for application and/or function data to be collected, stored, and/or accessed; and the entity's systems inventory 138 may comprise, for example, an authoritative source and inventory of all the systems in the entity. The global entity management system 140 may comprise, for example, a database that includes corporate governance and reportable events information for the legal entities within the entity as defined in the management policy of the entity; and the entity-approved supplier policy interface 142 may provide, for example, access to the contracts that may be established for each vendor relating to one or more applications in an initiative. The real estate management system (not shown) may be used, for example, for data center management; and the global data warehouse (not shown) may comprise, for example, a data repository from which all user details may be extracted.

As noted, embodiments of the invention may employ a software framework, such as the dot net framework developed by MICROSOFT®, that may run, for example, on a graphical operating system, such as MICROSOFT WINDOWS®. As also noted, embodiments of the invention may provide one or more applications that run, for example, in a web browser with user interface features, such as drop down menus, search features, and the like. As additionally noted, embodiments of the invention may utilize a number of open source applications that supply data which enables users to select valid data in order to complete a number of different data fields. Aspects of the invention may involve, for example, collaboration or interaction with a business unit of an entity followed by a user accessing an application for embodiments of the invention based on access entitlements of the user.

An application for embodiments of the invention may provide a menu driven system with drop down menus prompting entry of information, such as purposes and uses of data that may be included in an initiative. In the case of employee information, such data may include, for example, names and other employee data including human resources (HR) information and employee profile information. Embodiments of the invention may provide an electronic library of applicable privacy and data protection laws for various countries throughout the world. Based at least in part on requirements found in such privacy and data protection laws, embodiments of the invention may also provide country specific questionnaires, which prompt a user for answers to a series of pre-loaded questions. Such questions may be based at least in part, for example, on key points or key areas that may address requirements associated with privacy and data protection laws of particular countries.

In the process of reviewing a particular application associated with an initiative, answers to the questions may be received in fields of a user interface of an application for embodiments of the invention, and entry of answers on some or all of the fields may be mandatory. The user interface aspect of embodiments of the invention may also involve, for example, user interface screen tabs allowing users to access different parts of one or more menus displayed on the screens. In embodiments of the invention, a user may employ the user interface, for example, to create a new initiative by selecting a "new" tab on a menu bar displayed on the screen, which may be displayed only if the user is entitled with a role, such as "business user" or "business coordinator". Upon receiving a selection of the "new" tab, an initiative screen may open to a "main" display screen that may include, for example, tabs for "systems inventory of the entity", "scope", "business relationships", "associated users", and "questions" and "attachments". The business user or business coordinator may create a new initiative by completing all required fields on each of the display screens that are opened by selecting such tabs.

The user interface for embodiments of the invention may involve, for example, various tabs and display screens associated with a selection of such tabs, such as a "search", "summary", and "main". In embodiments of the invention, the display screen associated with the "main" tab may capture key parameters of the initiative. Examples of fields found on the display screen associated with the main tab may include, for example, "managed segment", "purpose", "business functions", "initiative type", "affiliates", "data categories", and "commitments". It may be necessary to complete some or all of such fields initially in order to save the new initiative in a draft status. Once saved, a unique initiative ID may be generated, and additional tabs associated with other display screens may become available. Such additional tabs associated with other display screens may include tabs such as "data privacy items summary", "data privacy items details", "research request", "withdrawal request", "help" and "resources".

As also previously indicated, aspects of the invention may also involve, for example, a user interface displaying, for example, fields for a user to interact with the system for embodiments of the invention, including without limitation entry of data related to initiatives. Further, in embodiments of the invention, data may be downloaded via the interfaces from the internal repositories of the entity storing various information and references and formatted by the user interface to be utilized by users. Embodiments of the invention may employ, for example, a process of user entitlements to one or more system applications in which different users are given different roles to perform different responsibilities within the application or applications. Once data for an initiative is received, a workflow engine for embodiments of the invention may move the initiative information to various data privacy operation functions.

Embodiments of the invention may involve, for example, system processes such as planning an initiative, submitting the initiative, packaging the initiative, reviewing and supporting the initiative, and clearing the initiative. In a planning stage for embodiments of the invention, strategic plans may be created and initiatives may be identified and bundled for a business unit of the entity. In such process, guidance on such initiatives may be received from data privacy operation functions, and local business, legal, and compliance functions of embodiments of the invention may review plans and projects within initiatives.

Figure 2:
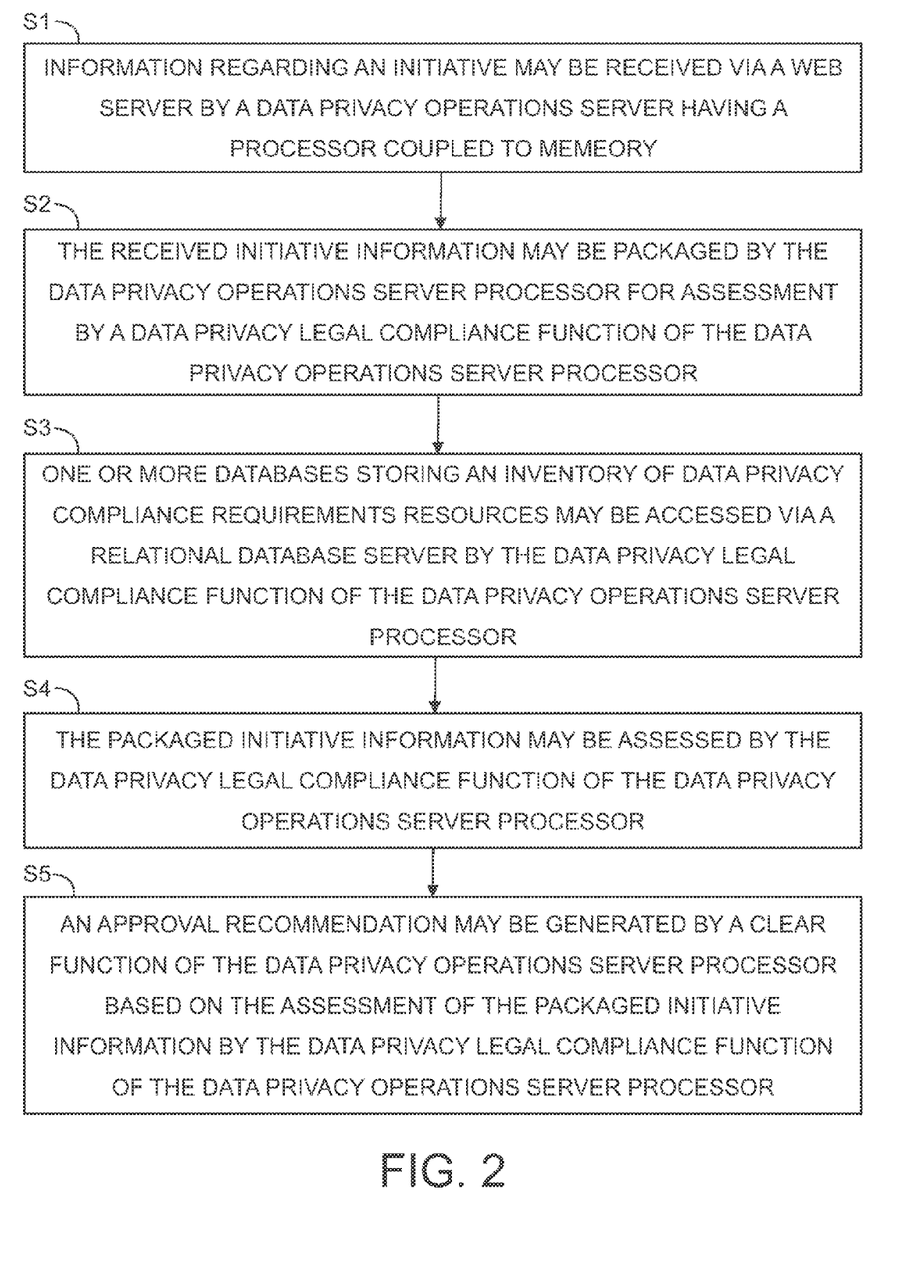
FIG. 2 is a flow chart that illustrates an example of a process according to embodiments of the invention.

FIG. 2 is a flow chart which illustrates an example of a process according to embodiments of the invention. Referring to FIG. 2, at 51, information regarding an initiative may be received via a web server by a data privacy operations server having a processor coupled to memory. At S2, the received initiative information may be packaged by the data privacy operations server processor for assessment by a data privacy legal compliance function of the data privacy operations server processor. At S3, at least one database storing an inventory of data privacy compliance requirements resources may be accessed via a relational database server by the data privacy legal compliance function of the data privacy operations server processor.

Referring further to FIG. 2, at S4, the packaged initiative information may be assessed by the data privacy legal compliance function of the data privacy operations server processor. At S5, an approval recommendation may be generated by a clear function of the data privacy operations server processor based on the assessment of the packaged initiative information by the data privacy legal compliance function of the data privacy operations server processor.

In aspects of embodiments of an invention, data for an initiative may be received, for example, from a project manager or an application owner within an entity that involves questions related to requirements that may be necessary to address because of a use of personally identifiable information for a particular purpose. Such purpose or use may involve use, for example, of customer data, internal employee data, or the personally identifiable data of other persons.

An aspect of embodiments of the invention may involve assuring that a dataset associated, for example, with either customer or employee data is defined when identifying or addressing data privacy and protection laws of various countries. Such aspect may also involve, for example, defining the business purpose or purposes and objectives of the initiative. This aspect may further involve, for example, identifying data types or data elements associated with an application in the initiative and the use of those data types or elements.

Such aspect may also involve, for example, defining access, storage and transfer points of the application for each of the various countries. Additionally, details regarding whether or not information involved in the initiative will be processed internally or externally may be captured in such aspect. In other words, details may be captured regarding whether or not third parties may process or exchange the information associated with either customer or employee data.

In the submitting stage of embodiments of the invention, data for initiatives may be submitted for the business unit into the data privacy automation tool and reviewed by a data privacy operations function. In a packaging process for embodiments of the invention, the data privacy operations function may package and submit the initiatives for regional and in-country review, if needed.

In embodiments of the invention, an initial stage may involve onboarding of the submitted initiative. The onboarding function for embodiments of the invention may involve, for example, quality control aspects to assure that all mandatory details of the initiative have been received. When the information received for the initiative is deemed to be adequate, a workflow engine for embodiments of the invention may move the initiative information to a succeeding stage in the workflow process.

Such succeeding phase or stage may involve, for example, data processing in which the data privacy operation function for embodiments of the invention interfaces directly with a legal and compliance function of the entity in each of the countries in which the entity operates and which may impact or be identified as part of the particular initiative. The legal and compliance function for embodiments of the invention, may involve, for example, a review and evaluation of the initiative information against the privacy and data protection laws and regulations of each of such countries. When one or more questions arise as a result of such review and evaluation, one or more legal and/or compliance queries or research requests for additional information may be generated and returned to the business unit from which the initiative information was received.

In the in-country review process, initiatives may be reviewed against privacy laws and regulations by local business, legal, and compliance functions of embodiments of the invention. In the reviewing and supporting process of embodiments of the invention, the initiatives may be sponsored locally and gaps in submissions may be communicated by the local business, legal, and compliance functions. Also in the review and support process, responses may be provided to queries generated by the legal and compliance functions. Also in this process, additional input necessary to address action items may be received from the business unit.

Once the initiative is fully vetted, an approval of the initiative may be generated at the legal and compliance function. In embodiments of the invention, such approval may include, for example, confirmation that a notification was generated to, or an approval was sought and received from, the appropriate regulator or regulators in each of the impacted or affected countries regarding the initiative. When such approval is received, the data privacy operation function for embodiments of the invention may receive via the workflow engine all documentation that supports the approval, including without limitation, all notifications and requests for approval that were submitted or filed and all approvals that were secured.

When such document is received by the data privacy operation function for embodiments of the invention, the documentation may be reviewed and approved, and a notification of approval for implementation of the initiative in the particular countries may be generated and returned to the business unit of the entity. In the clearing function for embodiments of the invention, a recommendation for clearance of the initiative may be generated by the local business, legal, and compliance functions, and final clearance approvals may be generated by the privacy data processing operations function, whereupon the initiative may be implemented by the business unit. In addition, embodiments of the invention may utilize business intelligence resources, such as BUSINESS OBJECTS® for reporting on a back end that enables users to generate various types of reports which may be needed and to which such users may have entitlements.

Embodiments of the invention may involve, for example, various system functions such as the automated data pull from various resources, as well as initiative review, packaging and publishing of initiatives, in-country initiative review, research requests, withdrawal requests, and user interfaces. The initiative review function for embodiments of the invention may involve, for example, a region and country support unit function at which a data privacy complaint initiative may be reviewed to ensure data privacy compliance in each country of an initiative, as well as all initiative data.

In addition, the region and country support unit function and a regional managers function for embodiments of the invention may involve review of the initiative to ensure data accuracy and requirements for in-country review and clearance of the initiative. The packaging and publishing functions for embodiments of the invention may involve, for example, a mapping functionality and a functionality for review of received initiative information for data privacy requirements of various countries, including denial of an initiative in a particular country to enable compliance with local privacy rules, regulations, and laws.

An online initiative packaging function for embodiments of the invention may involve, for example, packaging and publishing of initiatives to various countries for communication with a country compliance function for faster review and tracking of initiatives. The in-country initiative review function for embodiments of the invention may involve, for example, an in-country initiative review and clearance function for online review and clearance of data privacy requirements and initiatives by in-country compliance, legal, human resources, region and country support unit functions.

The research request function for embodiments of the invention may provide, for example, support for research request workflow that involves generation of requests for additional information or clarification to validate details on an initiative in order to obtain eventual clearance. The request withdrawal function for embodiments of the invention may enable, for example, a business unit of the entity, the data privacy operation, and/or an in-country function to withdraw initiatives from in-country review. The user interface functions for embodiments of the invention may include, for example, advanced search functions to support an ability to select a particular initiative and one or more dashboards that enable business unit users and data privacy operations users to track a status of an initiative review and actions items in real-time.

Embodiments of the invention may involve, for example, various automated system functions, such as initiative on-boarding functions, in-country review and clearance process functions, initiative status tracking functions, data privacy laws inventory functions, and system framework and reporting functions. The initiative on-boarding function for embodiments of the invention may include, for example, a fast track initiatives function, a collaborative process/priority handling function, an online submissions by business units function, a data privacy operations online review function, a question and answer business unit review function, and an automated data pull from resources function. As previously noted, such resources may include, for example, the data standards management tool interface 136, the systems inventory of the entity interface 138, the global entity management system interface 140, and the entity-approved supplier policy interface 142, as well as the real estate management system and the global data warehouse.

Data which may be pulled automatically may include, for example, application details, such as managed segment and geography and legal entity details from the data standards management tool 136 and the global entity management system 140; data privacy details, business and technology owners, and systemic initiative triggers from the entity's systems inventory 138; third party details, such as third party information security assessment details, contract details, and date of last assessment from the entity-approved supplier policy interface 142; user details from the global data warehouse; and data center details from the real estate management system.

The in-country review and clearance process automated function for embodiments of the invention may involve, for example, a packaging-bucket and build function, an automated document creation function, and country profile aspects, such as a data privacy risk determination function, a regional provisioning function, a country data privacy item and action plan function, and a research request function. The initiative status tracking automated functions for embodiments of the invention may involve, for example, a notifications function, a retroactive review and tracking function, an automated initiative tracking function, and an automated initiative status update function.

The data privacy laws inventory automated functions for embodiments of the invention may include, for example, one or more databases storing an inventory of data privacy laws and third party contract linkages. The data privacy laws inventory database may include, for example, and interface with the resources function, a country risk control matrix, and a link to initiative. The system framework and reporting automated functions for embodiments of the invention may include, for example, a dashboard and work queue function, an online context sensitive help function, a customer reporting function, a maintenance processes function, an audit trail function, a user work queue and inbox function, a system roles and access function, and an automated user provisioning function.

Embodiments of the invention may involve, for example, various system roles, such as business unit roles, data privacy operations roles, and country roles. The business unit roles for embodiments of the invention may include, for example, a business user role, a business coordinator role, and a business, operations, and technology leads role. The business user role may involve, for example, creating and submitting initiatives for data privacy operations review, withdrawing initiatives, creating, tracking and responding to research requests, viewing and updating initiatives of which the user is an owner or contributor at or below a particular entitlement level, and accessing reports based on such entitlements.

The business coordinator role may involve, for example, performing all functions available to business users, with an ability to update all initiatives at or below an entitled level and override a requirement for an initiative to be reviewed by a business unit, and technology and operations leads prior to submission for data privacy operations review. The business operations and technology leads role may involve, for example, reviewing and approving initiatives submitted by a business user or business coordinator.

The data privacy operations roles for embodiments of the invention may include, for example, a data privacy operations privacy client and relationship service analyst/manager role, a data privacy operations region and country support unit country/regional manager role, a data privacy operations requirement analyst/manager role. The data privacy operations privacy client and relationship service analyst/manager role may involve, for example, reviewing and onboarding initiative, working with business and progressing an initiative for country review, and creating, tracking and responding to research requests. The data privacy operations region and country support unit country/regional manager role may involve, for example, reviewing and creating data privacy items, packaging and publishing initiative for in-country review, and creating, tracking and responding to research requests.

The data privacy operations requirement analyst/manager role may involve, for example, reviewing and approving clearance of data privacy items and initiatives, approving initiative withdrawals from a country, and creating, tracking and responding to research requests. The country roles for embodiments of the invention may include, for example, a primary country contacts role. The primary country contacts/country contacts role may involve, for example, reviewing and clearing data privacy items, and creating, tracking and responding to research request.

It is to be understood that embodiments of the invention may be implemented as processes of a computer program product, each process of which is operable on one or more processors either alone on a single physical platform, such as a single computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general, such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A system, comprising:
a data privacy operations server having a processor coupled to memory, the processor being programmed to receive information via a web server regarding an initiative, the data privacy operations server processor being further programmed to package the received initiative information for assessment by a data privacy legal compliance function of the processor;
at least one database storing an inventory of data privacy compliance requirements resources accessible by the data privacy legal compliance function of the data privacy operations server processor via a relational database server to assess the packaged initiative information; and
a clear function of the data privacy operations server processor that generates a recommendation, based on the assessment of the packaged initiative information by the data privacy legal compliance function of the data privacy operations server processor, for a notification of, or an approval request to, at least one official data privacy or data protection office of at least one country regarding the initiative;
the data privacy legal compliance function of the data privacy operations server processor that generates an approval consisting at least in part of a confirmation that said notification was generated to, or said approval was received from, said at least one official data privacy or data protection office of said at least one country regarding the initiative; and
the data privacy operations server processor being further programmed to receive said confirmation and supporting documentation consisting at least in part of said notification that was generated to, or said approval that was received from, said at least one official data privacy or data protection office of said at least one country regarding the initiative and to generate a final clearance approval of the initiative upon receipt of said confirmation and supporting documentation.

2. The system of claim 1, further comprising at least one terminal coupled to the data privacy operations server that displays a user interface implemented by at least a model-view-controller of the data privacy operations server processor.

3. The system of claim 2, wherein the user interface formats and displays data privacy compliance requirements from the data privacy compliance requirements resources accessed by the data privacy legal compliance function.

4. The system of claim 2, wherein the user interface displays a plurality of data entry fields to receive the initiative information.

5. The system of claim 4, wherein the user interface displays the plurality of data entry fields to receive the initiative information and define a dataset addressing data privacy legal compliance requirements for a plurality of different countries.

6. The system of claim 5, wherein the user interface displays the plurality of data entry fields to define a dataset addressing data privacy legal compliance requirements for a plurality of different countries responsive to country-specific queries.

7. The system of claim 1, further comprising a workflow engine of the data privacy operations server processor that advances the packaged initiative information to the data privacy legal compliance function of the data privacy operations server processor.

8. The system of claim 1, wherein the at least one database storing the inventory of data privacy compliance requirements resources is communicatively coupled to the data privacy legal compliance function of the data privacy operations server processor via a service-oriented architecture web service.

9. The system of claim 1, wherein the inventory of data privacy compliance requirements resources stored on the at least one database comprises a data standards management interface, a systems inventory, a global data warehouse, and a supplier policy interface.

10. The system of claim 1, wherein the inventory of data privacy compliance requirements resources stored on the at least one database comprises an electronic library of data privacy protection legal requirements.

11. A method comprising:
receiving, by a data privacy operations server having a processor coupled to memory, information via a web server regarding an initiative;
packaging, by the data privacy operations server processor, the received initiative information for assessment by a data privacy legal compliance function of the data privacy operations server processor;
accessing, by the data privacy legal compliance function of the data privacy operations server processor, at least one database storing an inventory of data privacy compliance requirements resources via a relational database server;
assessing, by the data privacy legal compliance function of the data privacy operations server processor, the packaged initiative information; and
generating, by a clear function of the data privacy operations server processor, an approval recommendation based on the assessment of the packaged initiative information by the data privacy legal compliance function of the data privacy operations server processor;
generating, by the clear function of the data privacy operations server processor, a recommendation, based on the assessment of the packaged initiative information by the data privacy legal compliance function of the data privacy operations server processor, for a notification of, or an approval request to, at least one official data privacy or data protection office of at least one country regarding the initiative;
generating, by the data privacy legal compliance function of the data privacy operations server processor, an approval consisting at least in part of a confirmation that said notification was generated to, or said approval was received from, said at least one official data privacy or data protection office of said at least one country regarding the initiative; and
receiving, by the data privacy operations server processor, said confirmation and supporting documentation consisting at least in part of said notification that was generated to, or said approval that was received from, said at least one official data privacy or data protection office of said at least one country regarding the initiative and generating a final clearance approval of the initiative upon receipt of said confirmation and supporting documentation.

12. The method of claim 11, wherein receiving the information further comprises receiving the information regarding the initiative via at least one terminal coupled to the data privacy operations server displaying a user interface implemented by at least a model-view-controller of the data privacy operations server processor.

13. The method of claim 12, wherein receiving the information further comprises receiving the information regarding the initiative via the user interface displaying a plurality of data entry fields defining a dataset addressing data privacy legal compliance requirements.

14. The method of claim 13, wherein receiving the information further comprises receiving the information regarding the initiative via the user interface displaying the plurality of data entry fields for receiving the initiative information defining the dataset addressing data privacy legal compliance requirements for a plurality of different countries.

15. The method of claim 14, wherein receiving the information further comprises receiving the information regarding the initiative via the user interface displaying the plurality of data entry fields for entry of data privacy legal compliance information responsive to country-specific queries.

16. The method of claim 11, wherein packaging the received initiative information further comprises advancing the packaged initiative information to the data privacy legal compliance function of the data privacy operations server processor by a workflow engine of the data privacy operations server processor.

17. The method of claim 11, wherein accessing the at least one database further comprises accessing the at least one database storing the inventory of data privacy compliance requirements resources communicatively coupled to the data privacy legal compliance function of the data privacy operations server processor via a service-oriented architecture web service.

18. The method of claim 11, wherein accessing the at least one database further comprises formatting and displaying, on the at least one terminal, data privacy compliance requirements from the data privacy compliance requirements resources stored on the at least one database accessed by the data privacy legal compliance function.

19. The method of claim 11, wherein assessing the packaged initiative information further comprises assessing the packaged initiative information based at least in part on data from the inventory of data privacy compliance requirements resources comprising a data standards management interface, a systems inventory, a global data warehouse, and a supplier policy interface.

20. The method of claim 11, wherein assessing the packaged initiative information further comprises assessing the packaged initiative information based at least in part on data from the inventory of data privacy compliance requirements resources comprising an electronic library of data privacy protection legal requirements.

* * * * *